United States Patent [19]
Beck et al.

[11] 3,920,649
[45] Nov. 18, 1975

[54] PROCESS FOR THE PREPARATION OF CHLOROPYRIMIDINES

[75] Inventors: Gunther Beck, Leverkusen; Fritz Döring, Odenthal-Globusch; Hans Holtschmidt, Berg.Gladbach; Kurt Ley, Odenthal-Globusch, all of Germany

[73] Assignee: Bayer Aktiengesellschaft, Leverkusen-Bayerwerk, Germany

[22] Filed: Feb. 15, 1974

[21] Appl. No.: 443,120

[30] Foreign Application Priority Data
Feb. 17, 1973 Germany............................ 2307863

[52] U.S. Cl............................................. 260/251 R
[51] Int. Cl.$^2$....................................... C07D 239/00
[58] Field of Search ............................... 260/251 R

[56] References Cited
UNITED STATES PATENTS
3,629,261 12/1971 Beck et al....................... 260/251 R

*Primary Examiner*—Elbert L. Roberts
*Attorney, Agent, or Firm*—Plumley & Tyner

[57] ABSTRACT

Preparation of chloropyrimidines, characterised in that a N-(2-cyanoethyl)-formamide of the formula

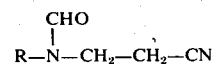

wherein R is between radical which can be split off under the reaction conditions, optionally in the presence of an inert diluent, is first treated with an acid chloride at temperatures between 0° and 100°C and is simultaneously or subsequently reacted with excess chlorine at temperatures of betwee 0° and 250°C, optionally whilst irradiating with UV.

23 Claims, No Drawings

PROCESS FOR THE PREPARATION OF CHLOROPYRIMIDINES

The subject of the present invention is a new process for the preparation of chlorinated pyrimidines.

The process is characterised in that N-(2-cyanoethyl)-formamides of the formula

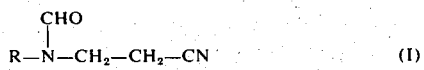
(I)

wherein:

R denotes a radical which can be split off under the reaction conditions, optionally mixed with an inert diluent, are first treated with acid chlorides at temperatures of about 0°C to about 100°C and are simultaneously or subsequently reacted with excess chlorine at temperatures of about 0°C to about 250°C.

Suitable radicals R which can be split off under the reaction conditions are, in particular, lower alkyl, preferably $C_1$–$C_4$-alkyl, such as methyl, ethyl, propyl and butyl, and also lower alkenyl, especially $C_2$–$C_4$-alkenyl, such as allyl, it also being possible for these groups to be substituted, for example by chlorine, hydroxyl, $C_1$–$C_4$-alkoxy or optionally substituted phenyl.

Examples of suitable radicals of this nature are chloromethyl, chloroethyl, hydroxyethyl, methoxyethyl, benzyl, phenylethyl, chloropropyl and methoxypropyl.

The starting compounds of the formula (I) are only known in some cases. However, they can be prepared easily in accordance with the instructions of German Pat. No. 1,130,815 by condensing cyanoethylated amines (II), in which:

R has the abovementioned meaning with formic acid in accordance with the equation

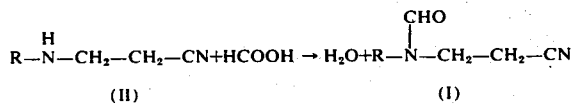

and removing the water of reaction in a suitable manner.

The cyanoethylated amines (II) are obtained, for example, in accordance with the following equation

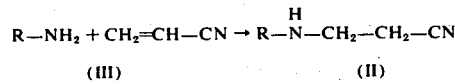

by addition reaction of primary amines (III),
in which:

R has the abovementioned meaning with acrylonitrile. (Compare, for example, *J. Am. Chem. Soc.* 66, 725 (1944), *J. Am. Chem. Soc.* 68, 1,217 (1946), *J. Am. Chem. Soc.* 78, 2,573 (1956) and *J. Heterocyclic Chem.* 1, 260 (1964).

A further possible method of preparation of the starting compounds of the formula (I) is the addition reaction of acrylonitrile with suitable N-alkyl-formamides (IV),
in which:

R has the abovementioned meaning in accordance with the equation

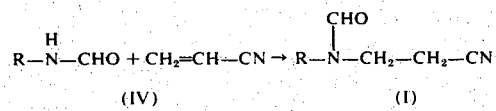

in the presence of alkaline catalysts, for example sodium (compare, for example, French Patent No. 976,959).

Suitable N-(2-cyanoethyl)-formamides of the formula (I) for the process according to the invention are, for example:

N-(2-cyanoethyl)-N-methyl-formamide, N-(2-cyanoethyl)-N-ethylformamide, N-(2-cyanoethyl)-N-(2-chloroethyl)-formamide, N-(2-cyanoethyl)-N-(2-methoxyethyl)-formamide, N-(2-cyanoethyl)-N-propyl-formamide, N-(2-cyanoethyl)-N-allyl-formamide, N-(2-cyanoethyl)-N-(3-methoxypropyl)-formamide, N-(2-cyanoethyl)-N-butyl-formamide, N-(2-cyanoethyl)-N-benzyl-formamide and N-(2-cyanoethyl)-N-phenethyl-formamide.

Diluents which are inert under the reaction conditions are all solvents resistant to chlorine, for example chlorinated aliphatic and aromatic hydrocarbons, such as chloroform, carbon tetrachloride, 1,1,2,2,-tetrachloroethane, 1,1,2,3,3-pentachloropropane, hexachlorocyclopentadiene, octachlorocyclopentene and 1,2,4-trichlorobenzene, chlorinated pyrimidines and also phosphorus oxychloride, thionyl chloride or sulphuryl chloride. In general, 0.5 to 20, preferably 1 to 10, parts by volume of diluent are used per part by volume of (I).

Suitable acid chlorides are preferably chlorides of inorganic acids such as phosgene, thionyl chloride, sulphuryl chloride, phosphorus pentachloride, phosphorus trichloride and phosphorus oxychloride. Oxalyl chloride may be mentioned as an example of an organic acid chloride.

For complete conversion of the N-(2-cyanoethyl)-formamides (I), the use of at least 1 mol of the acid chloride per mol of (I) is necessary. In general, between 1 and 2 mols of acid chloride per mol of (I) are employed. Phosphorus oxychloride and thionyl chloride can at the same time also be used as diluents. In addition, phosphorus oxychloride can also be employed solely as a diluent if a more reactive acid chloride, for example phosgene, oxalyl chloride or phosphorus pentachloride, is added to the mixture of $POCl_3$ and (I) which has been freshly prepared at 0° to 30°C, or if first a part or the total amount of the more reactive acid chloride is added to the $POCl_3$ and thereafter (I) is introduced in portions, optionally simultaneously with the remaining acid chloride.

For the reaction with chlorine which follows the treatment with acid chloride, the chlorine is appropriately employed in excess (recognisable from the green colour of the chlorination exit gases); however, excess chlorine is not advantageous at the beginning of the chlorination reaction, particularly in the case of larger batches, since it causes the exothermic reaction to become too vigorous.

The minimum total amounts of chlorine to be employed are 4 mols per mol of (I), but in general a larger excess is used, which can be up to 10 times the minimum amount. Preferably, 5 to 20 mols of chlorine per mol of (I) are used.

In detail, the process is carried out by first mixing a N-(2-cyanoethyl)-formamide of the formula (I), especially N-(2-cyanoethyl)-N-ethyl-formamide, with one of the diluents mentioned, for example phosphorus oxychloride, at room temperature, and then allowing it to react with at least 1 mol of a preferably inorganic acid chloride, and preferably 1 to 2 mols. The lower limit of the temperature range (about 0° to 100°C) depends on the reactivity of the acid chloride employed. For example, phosgene, phosphorus pentachloride and oxalyl chloride react even at room temperature, in an exothermic reaction, so that cooling is desirable in particular when phosphorus oxychloride is intended to be used solely as a diluent and its functioning as an acid chloride, which commences at higher temperatures, is to be avoided. Where thionyl chloride and phosphorus oxychloride are employed in their capacity as acid chlorides, the lower temperature limit at which a rapid reaction commences is about 50°C; here, it is convenient to heat the mixture to its particular boiling point.

As already indicated, it is also possible, in the case of phosphorus oxychloride — which is particularly preferred as the sole diluent — to take the whole or part of the acid chloride initially and to add (I) in portions, if necessary with cooling, preferably at between 10° and 40°C.

The further course of the process can now be effected in various ways. One possibility is, for example, only to introduce chlorine into, or pass chlorine over, the mixture after complete termination of the reaction of (I) with the acid chloride in the temperature of about 0° to about 60°C. Since the initial reaction of (I), which has been treated with acid chloride, with chlorine takes place strongly exothermically, a temperature range of 10° to 40°C is preferred in this stage in order to avoid undesired side-reactions, and this temperature should be maintained both by cooling and by not passing the chlorine into, or over, the mixture excessively rapidly. After this first, more strongly exothermic, stage has subsided chlorine is taken up noticeably more slowly; the stream of chlorine can now be so regulated, up to the end of the chlorination reaction, that there is always a slight excess (greenish-coloured exit gas) present.

A further possibility is to allow the treatment with acid chloride and the first chlorination phase which has been mentioned to take place practically simultaneously — optionally after first having added a small proportion of the acid chloride. Here it is again possible either first to take the acid chloride (for example in the case of $PCl_5$ or $PCl_3 + Cl_2$) and to feed in (I) and chlorine simultaneously, or first to take (I) and to meter in acid chloride and chlorine simultaneously, or (for example in the case of phosgene) to introduce the phosgene, (I) and chlorine practically simultaneously into initially taken diluent.

The resulting products of the chlorination reaction according to the invention are in general mixtures of 4,5,6-trichloropyrimidine and tetrachloropyrimidine in high total yield (most exceeding 90%). The temperature control during chlorination following the first exothermic step, described above, is of decisive importance in determining the ratio of trichloropyrimidine/-tetrachloropyrimidine.

For example, a pyrimidine mixture which consists to the extent of at least 95% by weight of tetrachloropyrimidine — which is of particular interest as a dyestuff intermediate product — is obtained if, optionally after raising the temperature at 5° to 15°C per hour (depending on the size of the batch), a reaction temperature of at most 65°C is maintained for at least 36 hours. However, these 36 hours only suffice if it proves possible to carry out the chlorination in a homogeneous phase. If the chlorination batch is heterogeneous (due to the formation of sparingly soluble precipitates), the time required to form the desired tetrachloropyrimidine is naturally considerably greater (about 2 to 4 times as great). The requirement for a homogeneous chlorination solution, which is important from an economic point of view, can be satisfied, above all, by choosing a suitable radical R in (I). In the case of (I) with R = propyl and butyl, in the particularly preferred solvent phosphorus oxychloride, a homogeneous solution is present in all stages of the chlorination reaction, whilst in the case of (I) with R = ethyl this can be achieved by maintaining a certain minimum concentration of HCl in the reaction mixture. It suffices if after termination of the first exothermic chlorination stage (autogenic production of HCl), approx. 1 g/HCl per hour and per 100 ml of $POCl_3$ is introduced additionally.

In the case of (I) with R = methyl, using suitable solvents such as $POCl_3$ or 1,1,2,2-tetrachloroethane, only the precipitate produced in the first exothermic chlorination stage can be redissolved with HCl; the precipitate which recurs in the further course of the reaction at elevated temperatures can no longer be dissolved with excess HCl. Similar behaviour is shown by, for example, (I) with R = benzyl. To achieve as high a proportion of tetrachloropyrimidine as possible in the chloropyrimidine mixture, it is essential, in these cases, to continue chlorination at maximally 65°C until a homogeneous solution is present.

If a temperature range which is substantially below 65°C (for example 50°C or below) is chosen for the final stage of the chlorination, the content of 4,5,6-trichloropyrimidine can admittedly be reduced to approx. 1 per cent by weight or below, but only at the cost of the reaction velocity, which is naturally substantially reduced at lower temperatures.

If the temperature range chosen for the final stage of the chlorination is above 65°C, the proportion of 4,5,6-trichloropyrimidine obtained in the chloropyrimidine mixture is the higher, the more the temperature moves up from the 65°C limit. For example, a pyrimidine mixture consisting of approximately equal parts by weight of 4,5,6-trichloropyrimidine and tetrachloropyrimidine is obtained if the final stage of the chlorination is carried out in the temperature range of around 100°C (for example boiling $POCl_3$). However, in parallel with the increase in temperature and the growing proportion of 4,5,6-trichloropyrimidine, a lowering of the time required for chlorination is observable; even in the case of a chlorination in the heterogeneous phase (formation of a precipitate in the case of (I) with R = $CH_3$), a chlorination time of about 15 hours suffices at the temperature of boiling phosphorus oxychloride (approx. 100° to 105°C). In the range of 130° to 150°C, a chlorination time of about 1 to 5 hours suffices to give a pyrimidine mixture which consists predominantly of 4,5,6-trichloropyrimidine. Of course, it is not only the temperature range of the final stage of chlorination which determines the ratio of trichloropyrimidine to tetrachloropyrimidine but also the temperature-time relationship between approx. 30°C and the final temperature. Covering this temperature interval more rapidly increases the ratio of trichloropyrimidine to tetrachloropyrimidine, especially in the case of final temperatures above 65°C. To obtain a 4,5,6-trichloropyrimidine which is practically free of tetrachloropyrimidine it is possible to meter the chlorination solution — preferably after completion of the first exothermic chlorination phase at approx. 30°C — into a reaction vessel which has been preheated to 130°–150°C and optionally contains solvent, maintaining a constant excess of chlorine. In the case of (I) with R = methyl, in which the reaction times are particularly long at average temperatures because of the formation of a precipitate, a pyrimidine mixture which consists of 97–98 per cent by weight of 4,5,6-trichloropyrimidine is, however, obtained if, in the normally customary procedure, not more than 2 - 3 hours are taken to raise the temperature from approx. 30°C to 130°–150°C.

4,5,6-Trichloropyrimidine (boiling point$_{12}$ 87°C) and tetrachloropyrimidine (boiling point$_{12}$ 110°C) can easily be separated by distillation, for example with the aid of a column, because of their greatly differing boiling points. The percentage proportion in the chlorination mixture can furthermore be determined easily by analysis by gas chromatography.

If tetrachloropyrimidine is to be obtained as the principal end product, there is, in addition to the possibility of carrying out the final stage of the chlorination at not more than 65°C, also the method known from Belgian Pat. No. 706,760, in which the 4,5,6-trichloropyrimidine constituent is post-chlorinated to tetrachloropyrimidine in the temperature range of 150° to 250°C, preferably with UV irradiation, either in the chlorination mixture with tetrachloropyrimidine or after prior isolation by distillation.

The chloropyrimidines prepared according to the invention possess fungicidal and sporicidal properties (compare U.S. Pat. No. 3,227,612). Tetrachloropyrimidine is suitable for use as a reactive component in the preparation of reactive dyestuffs (compare, for example, Belgian Pat. No. 578,933), as is trichloropyrimidine (compare, for example, Belgian Pat. 572,994).

EXAMPLE 1

100 g of phosgene are first passed into 800 ml of phosphorus oxychloride in a 2 liter 4-neck flask equipped with a thermometer, 2 gas inlet tubes, a stirrer and a reflux condenser. 255 g (2.0 mols) of 99% strength N-ethyl-N-(2-cyanoethyl)-formamide are then added dropwise at about 25°C and thereafter 280 g of phosgene and 300 g of chlorine are introduced simultaneously in the temperature range of 30°–35°C. The mixture is then warmed to 58°C over the course of 2 hours whilst at the same time passing in chlorine (approx. 18 g/hour) and HCl (approx. 8 g/hour) and is kept at this temperature for a further 40 hours with the same amount of gas. After conclusion of the chlorination, POCl$_3$ is distilled off at 90 mm Hg and 90°C sump temperature. The sump material which remains is fractionated. Analysis by gas chromatography shows 10.5 g of 4,5,6-trichloropyrimidine and 404 g of tetrachloropyrimidine. Total yield of pyrimidine 95.4% of theory; the proportion of 4,5,6-trichloropyrimidine is approx. 2.5 per cent by weight of the total amount of pyrimidine.

Preparation of the starting product N-ethyl-N-(2-cyanoethyl)-formamide: 250 g (5.43 mols) of formic acid are first introduced into a 1 liter stirring apparatus and are reacted with 528 g (5.39 mols) of 3-ethylamino-propionitrile over the course of 2 hours in the temperature range of 35°–50°C, using water cooling. The mixture is then warmed to 100°C and the water produced in the reaction is distilled off under a water pump vacuum. Brief subsequent heating in an oil pump vacuum until boiling commences (120°C/2 mm Hg) gives 665 g of a sump product which according to analysis by gas chromatography contains 99% of N-ethyl-N-(2-cyanoethyl)-formamide.

Yield 97% of theory.

EXAMPLE 2

750 ml of phosphorus oxychloride, 344 g of phosphorus trichloride and 140 g of chlorine are successively introduced into an apparatus corresponding to Example 1. 315 g (2.5 mols) of N-ethyl-N-(2-cyanoethyl)-formamide are then added dropwise at 25° to 30°C over the course of approx. 2.5 hours and 400 g of chlorine is passed in at the same time. The temperature is now raised to 58°C in the presence of 30 g of chlorine/hour and 8 g of HCl/hour. 18 g of chlorine/hour and 8 g of HCl/hour are now passed in at 58°C over the course of 40 hours. Working up analogously to Example 1 gives 25.5 g of 4,5,6-trichloropyrimidine and 492 g of tetrachloropyrimidine: total yield of chlorinated pyrimidines 95.8% of theory; proportion of 4,5,6-trichloropyrimidine, 4.9 per cent by weight.

EXAMPLE 3

330 g of phosgene and 300 g of chlorine are introduced over the course of 3 hours into a mixture of 1,200 ml of phosphorus oxychloride and 227 g (2.0 mols) of 99% strength N-(2-cyanoethyl)-N-methyl-formamide in the temperature range of 25°–30°C. The temperature is brought to 40°C over the course of 2 hours in the presence of 30 g of chlorine/hour. The mixture is then kept for 90 hours at 40°C and 50 hours at 65°C, whilst passing in 15 g of chlorine/hour. After working up according to Example 1, 10.5 g of 4,5,6-trichloropyrimidine and 409 g of tetrachloropyrimidine are obtained. Total yield of pyrimidine 96.5% of theory; content of 4,5,6-trichloropyrimidine, 2.5 per cent by weight.

The starting product N-(2-cyanoethyl)-N-methylformamide is prepared analogously to the preparation of N-ethyl-N-(2-cyanoethyl)-formamide described in Example 1. Boiling point 125°–127°C/1 mm Hg.

EXAMPLE 4

330 g of phosgene are first introduced into a mixture of 1,300 ml of phosphorus oxychloride and 227 g (2.0 mols) of 99% strength N-(2-cyanoethyl)-N-methyl-formamide over the course of 2 hours at 20°–25°C and 300 g of chlorine are then introduced over the course of 1 hour at the same temperature. After chlorinating for 15 hours at 30°C in a homogeneous phase, the mixture is brought to 50°C over the course of 2 hours and is now chlorinated as a suspension for a period of 90 hours, with 15 g of chlorine/hour, until the precipitate produced has dissolved. Working up analogously to Example 1 gives 4.5 g of 4,5,6-trichloropyrimidine and 400 g of tetrachloropyrimidine. Total yield 93.0% of chloropyrimidines, of which approx. 1.1 per cent by weight are 4,5,6-trichloropyrimidine.

EXAMPLE 5

About 80 g of phosgene are initially introduced into a mixture of 250 ml of phosphorusoxychloride and 50 g (0.442 mol) of 99% strength N-(2-cyanoethyl)-N-methyl-formamide, whilst cooling with ice, and chlorine is then passed in until the exothermic reaction has ended. The stream of gas and the cooling are balanced against one another in such a way as to maintain a temperature range of 20°–30°C. The mixture is then heated to the reflux temperature (approx. 105°C) over the course of about 1½ hours whilst passing in a stream of chlorine which always gives some excess chlorine (green-colored exit gas). A further 50 ml of phosphorus oxychloride are added to the reaction mixture, which is now a rather thick paste, to make it easier to stir. After chlorination for 14 hours at approx. 105°C, the mixture is a clear, light yellow solution. Analysis, by gas chromatography, of the reaction mixture worked up analogously to Example 1 shows 41 g of 4,5,6-trichloropyrimidine and 41.5 g of tetrachloropyrimidine. Total yield 93.7% of theory: proportion of 4,5,6-trichloropyrimidine approx. 50 per cent by weight.

EXAMPLE 6

A mixture of 50 g (0.442 mol) of 99% strength N-(2-cyanoethyl)-N-methyl-formamide and 250 ml of 1,1,2,2-tetrachloroethane is first phosgenated at 20°–25°C until the exothermic reaction has terminated. The resulting precipitate is dissolved over the course of about 20 minutes by introducing excess HCl. The mixture is then chlorinated at between 25° and 35°C until the rapid absorption of chlorine has ceased; it is then heated whilst constantly passing in a slight excess of chlorine. One and a half hours after the start of the chlorination, the temperature reaches 80°C and a thick precipitate separates out. The temperature is raised to 140°C over the course of a further hour; after chlorinating for two hours at between 140° and 145°C, a clear light yellow solution has been obtained. After distilling off the bulk of the tetrachloroethane up to a bath temperature of 75°C at 13 mm Hg, the residual sump material is fractionated. Analysis by gas chromatography shows 70.5 g of 4,5,6-trichloropyrimidine and 1.4 g of tetrachloropyrimidine, corresponding to a total yield of 87.8% of theory. Proportion of 4,5,6-trichloropyrimidine, 98 per cent by weight.

EXAMPLE 7

50 g (0.442 mol) of 99% strength N-(2-cyanoethyl)-N-methyl-formamide are added dropwise to a mixture of 250 ml of 1,1,2,2-tetrachloroethane and 100 g of oxalyl chloride over the course of approx. 30 minutes, at 20°C. The resulting precipitate is dissolved over the course of about 20 minutes by passing in HCl at approx. 20°C. chlorination, initially at room temperature until the rapid absorption of chlorine has ceased, and subsequently whilst increasing the temperature, produces a thick precipitate after approx. 70 minutes at about 65°C. The mixture is heated to about 140°C over the course of a further 1½ hours whilst constantly maintaining as excess of chlorine and is chlorinated further at 140°–145°C until the precipitate has dissolved (approx. 2 hours). After working up analogously to Example 6, 72 g of 4,5,6-trichloropyrimidine and 2 g of tetrachloropyrimidine are obtained. Total yield 90.7% of theory; 97.3 per cent by weight consist of 4,5,6-trichloropyrimidine.

EXAMPLE 8

A mixture of 250 ml of thionyl chloride and 50 g (0.442 mol) of 99% strength N-2-(cyanoethyl)-N-methylformamide is warmed to 65°–75°C until the evolution of gas has ceased (approx. 1 hour). In spite of saturating the suspension with HCl at 20°C, the precipitate formed cannot be dissolved. Chlorination from 25°C onwards, as described in the preceding examples, gives a clear reddish solution after warming for 2 hours up to 65°C, and from this solution a precipitate which progressively becomes thicker separates out after further introduction of excess chlorine for 1–2 hours at 65°C. After addition of 250 ml of 1,1,2,2-tetrachloroethane and further heating under an excess of chlorine, whilst distilling off the thionyl chloride, the temperature reaches 140°C after 5 hours, and after a further 1½ hours at this temperature the precipitate has dissolved. After working up analogously to Example 6, 62 g of 4,5,6-trichloropyrimidine and 14.5 g of tetrachloropyrimidine are obtained. Total yield 91.5% of theory, proportion of 4,5,6-trichloropyrimidine 81 per cent by weight.

EXAMPLE 9

The procedure followed is analogous to Example 1, with the difference that 308 g (2.0 mols) of N-n-butyl-N-(2-cyanoethyl)-formamide are employed. Furthermore, the introduction of additional HCl can be dispensed with, since the reaction mixture is a homogeneous solution throughout. After working up analgously to Example 1, 16 g of 4,5,6-trichloropyrimidine and 400 g of tetrachloropyrimidine are obtained. Total yield of pyrimidine 96.1% of theory; proportion of 4,5,6-trichloropyrimidine, 3.8 per cent by weight.

The N-n-butyl-N-(2-cyanoethyl)-formamide used as the starting product is prepared from 3-n-butylaminopropionitrile by reaction with a slight excess of formic acid. It is isolated in the pure form as in the case of the corresponding ethyl compound, compare Example 1. It is over 99% pure according to analysis by gas chromatography; yield 95% of theory.

We claim:

1. Process for preparing a chloropyrimidine comprising treating a formamide of the formula

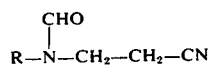

wherein:
R is $C_1$-$C_4$- alkyl or $C_2$-$C_4$-alkenyl; or $C_1$-$C_4$-alkyl or $C_2$-$C_4$-alkenyl substituted by chlorine, hydroxy, $C_1$-$C_4$-alkoxy or phenyl; with an acid chloride and excess chlorine at a temperature of 0° to 100°C.

2. Process of claim 1 conducted in the presence of ultraviolet radiation.

3. Process of claim 1 wherein said formamide is a N-(2-cyanoethyl)-N-($C_1$-$C_4$-alkyl)-formamide.

4. Process of claim 1 wherein said formamide is N-(2-cyanoethyl)-N-ethyl-formamide.

5. Process of claim 1 in which the acid chloride is phosgene.

6. Process of claim 1 in which the acid chloride is phosphorus pentachloride or phosphorus trichloride.

7. Process of claim 1 in which at least 1 mole of acid chloride per mole formamide is used.

8. Process of claim 1 in which 1 to 2 moles of acid chloride per mole of formamide is used.

9. Process of claim 1 in which the reaction is carried out at 10° to 40°C.

10. Process of claim 1 carried out in the presence of an inert diluent.

11. Process for preparing a chloropyrimidine comprising the steps of
   a. treating a formamide of the formula

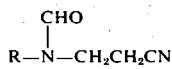

wherein R is $C_1$-$C_4$-alkyl; $C_2$-$C_4$-alkenyl; or $C_1$-$C_4$-alkyl or $C_2$-$C_4$-alkenyl substituted by chlorine, hydroxy, $C_1$-$C_4$-alkoxy or phenyl; with an acid chloride at a temperature of 0° to 100°C; and then
   b. reacting the resulting product with excess chlorine at a temperature of 0° to 250°C.

12. Process of claim 11 conducted in the presence of ultraviolet radiation.

13. Process of claim 11 wherein said formamide is a N-(2-cyanoethyl)-N-($C_1$-$C_4$-alkyl)-formamide.

14. Process of claim 11 wherein said formamide is N-(2-cyanoethyl)-N-ethyl-formamide.

15. Process of claim 11 in which the acid chloride is phosgene.

16. Process of claim 11 in which the acid chloride is phosphorus pentachloride or phosphorus trichloride.

17. Process of claim 11 in which at least 1 mole of acid chloride per mole of formamide is used.

18. Process of claim 11 in which 1 to 2 moles of acid chloride per mole of formamide is used.

19. Process of claim 11 in which step (a) is carried out at 10° to 40°C.

20. Process of claim 11 carried out in the presence of an inert diluent.

21. Process of claim 16 in which acid chloride is phosphorus trichloride and chlorine is present in step (a).

22. Process of claim 11 in which tetrachloropyrimidine is prepared by
   a. reacting N-(2-cyanoethyl)-N-ethylformamide in the presence of inert diluent at a temperature of 10°–40°C, with about 1 mole of phosgene, phosphorus pentachloride or mixture of phosphorus trichloride and chlorine;
   b. reacting the resulting product with at least an excess of 4 moles of chlorine at a temperature of up to 65°C; and then
   c. isolating tetrachloropyrimidine.

23. Process of claim 22 in which said inert diluent is phosphorus oxychloride.

* * * * *